US012592251B2

(12) United States Patent
Teo

(10) Patent No.: US 12,592,251 B2
(45) Date of Patent: Mar. 31, 2026

(54) LOAD BEAM FINE ACTUATOR PROTECTION FEATURE

(71) Applicant: Western Digital Technologies, Inc., San Jose, CA (US)

(72) Inventor: Kia Moh Teo, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/894,719

(22) Filed: Sep. 24, 2024

(65) Prior Publication Data

US 2026/0088045 A1     Mar. 26, 2026

(51) Int. Cl.
*G11B 5/48*      (2006.01)
*G11B 5/00*      (2006.01)
(52) U.S. Cl.
CPC ............ *G11B 5/4833* (2013.01); *G11B 5/483* (2015.09); *G11B 2005/0021* (2013.01)
(58) Field of Classification Search
None
See application file for complete search history.

(56) References Cited

U.S. PATENT DOCUMENTS

| | | | | |
|---|---|---|---|---|
| 4,167,765 | A | * | 9/1979 | Watrous ................ G11B 5/6005 |
| 5,872,687 | A | * | 2/1999 | Arya ..................... G11B 5/4853 |
| | | | | 360/264.2 |
| 6,052,258 | A | * | 4/2000 | Albrecht .............. G11B 5/4976 |
| 6,597,541 | B2 | | 7/2003 | Nishida et al. |
| 6,856,075 | B1 | | 2/2005 | Houk et al. |
| 7,006,333 | B1 | * | 2/2006 | Summers ............. G11B 5/4826 |
| 8,331,061 | B2 | | 12/2012 | Hanya et al. |
| 8,797,689 | B1 | | 8/2014 | Pan et al. |
| 9,190,086 | B1 | | 11/2015 | Ee et al. |
| 2003/0007291 | A1 | * | 1/2003 | Kasajima ............. G11B 5/4826 |
| 2006/0227464 | A1 | * | 10/2006 | Huang ..................... G11B 5/48 |
| 2007/0109690 | A1 | | 5/2007 | Yao et al. |
| 2007/0139825 | A1 | * | 6/2007 | Yao ....................... G11B 5/4833 |
| 2008/0304183 | A1 | * | 12/2008 | Kwon ................. G11B 5/4846 |
| | | | | 360/245.3 |

(Continued)

OTHER PUBLICATIONS

Liu, Yanning, Advance piezo-actuator technologies for hard disk drive applications, Microsystem Technologies (2023) 29:1117-1127, Received: Oct. 31, 2022 / Accepted: Apr. 20, 2023 / Published online: May 14, 2023, Springer-Verlag GmbH Germany.

(Continued)

*Primary Examiner* — Peter Vincent Agustin
(74) *Attorney, Agent, or Firm* — John D. Henkhaus

(57) ABSTRACT

A head gimbal assembly (HGA), such as for a hard disk drive (HDD), includes a load beam formed with proximal openings therethrough and a flexure coupled with the load beam, where the flexure includes a tongue portion to which a fine actuator is coupled and the tongue portion includes corner portions proximal to the fine actuator. Each opening of the load beam is shaped and positioned to overlay the corner portion of the flexure to avoid contact between the load beam and the corner portion in response to shock events. Flexure gimbal clearance relative to the load beam is thereby enabled to protect the integrity of the fine actuator piezoelectric elements from non-operational shock events for example.

19 Claims, 6 Drawing Sheets

(56)     References Cited

U.S. PATENT DOCUMENTS

| | | | | |
|---|---|---|---|---|
| 2009/0195919 A1* | 8/2009 | Mahadev | G11B 5/4833 | 360/240 |
| 2010/0265621 A1* | 10/2010 | Feng | G11B 5/4826 | 360/245.3 |
| 2017/0316796 A1 | 11/2017 | Kumar et al. | | |
| 2021/0390979 A1* | 12/2021 | Ee | G11B 5/4826 | |
| 2023/0326483 A1* | 10/2023 | Zhang | G11B 5/4833 | 360/245.3 |

OTHER PUBLICATIONS

Kon, Stanley et al., Design and fabrication of a piezoelectric instrumented suspension for hard disk drives, Smart Structures and Materials 2006: Sensors and Smart Structures Technologies for Civil, Mechanical, and Aerospace Systems, Proc. of SPIE vol. 6174, 617430, (2006), 10 pp.

* cited by examiner

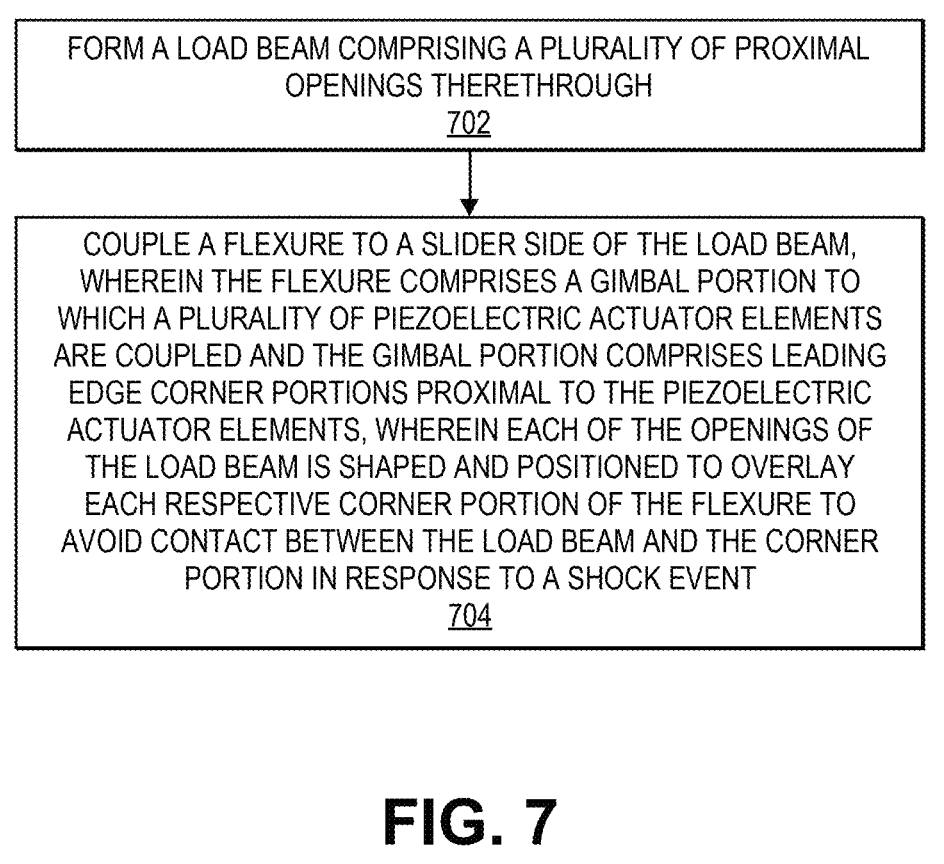

FORM A LOAD BEAM COMPRISING A PLURALITY OF PROXIMAL
OPENINGS THERETHROUGH
702

COUPLE A FLEXURE TO A SLIDER SIDE OF THE LOAD BEAM,
WHEREIN THE FLEXURE COMPRISES A GIMBAL PORTION TO
WHICH A PLURALITY OF PIEZOELECTRIC ACTUATOR ELEMENTS
ARE COUPLED AND THE GIMBAL PORTION COMPRISES LEADING
EDGE CORNER PORTIONS PROXIMAL TO THE PIEZOELECTRIC
ACTUATOR ELEMENTS, WHEREIN EACH OF THE OPENINGS OF
THE LOAD BEAM IS SHAPED AND POSITIONED TO OVERLAY
EACH RESPECTIVE CORNER PORTION OF THE FLEXURE TO
AVOID CONTACT BETWEEN THE LOAD BEAM AND THE CORNER
PORTION IN RESPONSE TO A SHOCK EVENT
704

FIG. 7

LOAD BEAM FINE ACTUATOR PROTECTION FEATURE

FIELD OF EMBODIMENTS

Embodiments of the invention may relate generally to hard disk drives and particularly to a load beam gimbal clearance feature for fine actuator shock stress protection.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

An HDD includes at least one head gimbal assembly (HGA) that generally includes a slider that houses the read-write transducer (or "head") and a suspension. Each slider is attached to the free end of a suspension that in turn is cantilevered from the rigid arm of an actuator. Several actuator arms may be combined to form a single movable unit, a head stack assembly (HSA), typically having a rotary pivotal bearing system. The suspension of a conventional HDD typically includes a relatively stiff load beam with a mount plate at its base end, which attaches to the actuator arm, and whose free end mounts a flexure (at least a portion of which may be referred to as a "gimbal" or "gimbal flexure") that carries the slider and its read-write head. Positioned between the mount plate and the functional end of the load beam is effectively a "hinge" that is compliant in the vertical bending direction (normal to the disk surface). The hinge enables the load beam to suspend and load the slider and the read-write head toward the spinning disk surface. It is then the function of the flexure to provide gimbaled support for the slider so that the slider can pitch and roll in order to adjust its orientation. However, customer specifications and/or common design and operational constraints include operational shock (or "op-shock") and non-operational shock (or "non-op shock") requirements, which generally relate to an HDD's resistance to or tolerance of a mechanical shock event while operating and while not operating, respectively.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 7 is a flow diagram illustrating a method of manufacturing a head gimbal assembly, according to an embodiment.

DETAILED DESCRIPTION

Figure 1:
FIG. 1 is a plan view illustrating a hard disk drive, according to an embodiment.
Figure 1:

Generally, approaches to a load beam gimbal clearance feature for fine actuator shock stress protection for a hard disk drive (HDD) are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment or to every embodiment.

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the structure is vertical for all practical purposes but may not be precisely at 90 degrees throughout.

While terms such as "optimal", "optimize", "minimal", "minimize", "maximal", "maximize", and the like may not have certain values associated therewith, if such terms are used herein, the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

CONTEXT

Increasing areal density (a measure of the quantity of information bits that can be stored on a given area of disk surface) has led to the necessary development and implementation of secondary and even tertiary actuators (generally, "fine actuators") for improved head positioning through relatively fine positioning, in addition to a primary voice coil motor (e.g., VCM) actuator which provides relatively coarse positioning. Some HDDs employ milli- or micro-actuator designs to provide second and/or third stage actuation of the recording head to enable more accurate positioning of the head relative to the recording tracks. Milli-actuators may be broadly classified as actuators that move the entire front end of the suspension: e.g., load beam, flexure, and slider, and are typically used as second stage actuators. Micro-actuators (or "microactuators") may be broadly classified as actuators that move (e.g., rotate) only the slider, moving it relative to the suspension and load beam, or move only the read-write element relative to the slider body. A microactuator may be used solely in conjunction with a first stage actuator (e.g., VCM) or in conjunction with a first stage actuator and a second stage actuator (e.g., milli-actuator) for more accurate head positioning. Unless otherwise indicated, the terms "microactuator", "milli-actuator", "secondary actuator", "tertiary actuator", "dual stage actuator", "fine actuator" and the like, if used herein, refer generally to a relatively fine-positioning actuator (e.g., technically, either secondary or tertiary) used in conjunction with a primary relatively coarse-positioning actuator, such as a VCM actuator in the context of an HDD. Piezoelectric (PZT) based and capacitive micro-machined transducers are two types of fine-actuators that have been developed for use with HDD sliders.

Another approach to increasing the areal density involves the use of heat-assisted magnetic recording (HAMR). With HAMR, a laser light source (e.g., a laser diode) is integrated onto a magnetic recording head slider. Laser diodes are fragile and typically not suitable for direct mechanical attachment to the head slider. Therefore, a submount assembly may be used to mount the laser diode to the slider body. With the addition of such HAMR components to an otherwise conventional head slider, additional mechanical tolerances and constraints as well as different structural dynamics are likewise introduced into slider-suspension designs.

Figure 2A:
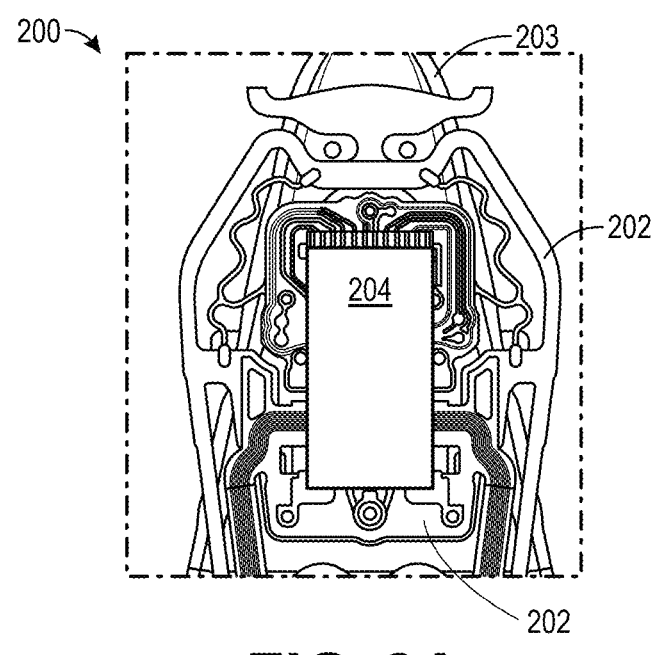
FIG. 2A is a slider side plan view illustrating a head gimbal assembly (HGA)
Figure 2B:
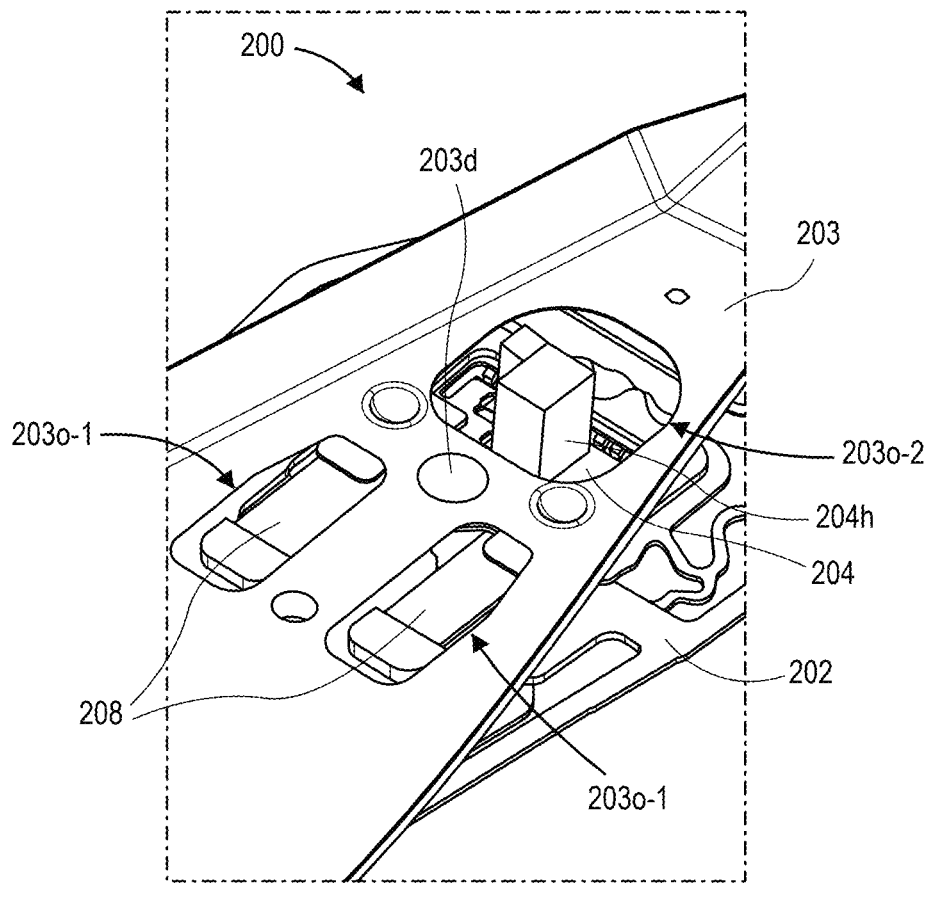
FIG. 2B is a perspective view illustrating a heat-assisted magnetic recording (HAMR) HGA.
Figures 2C, 3:
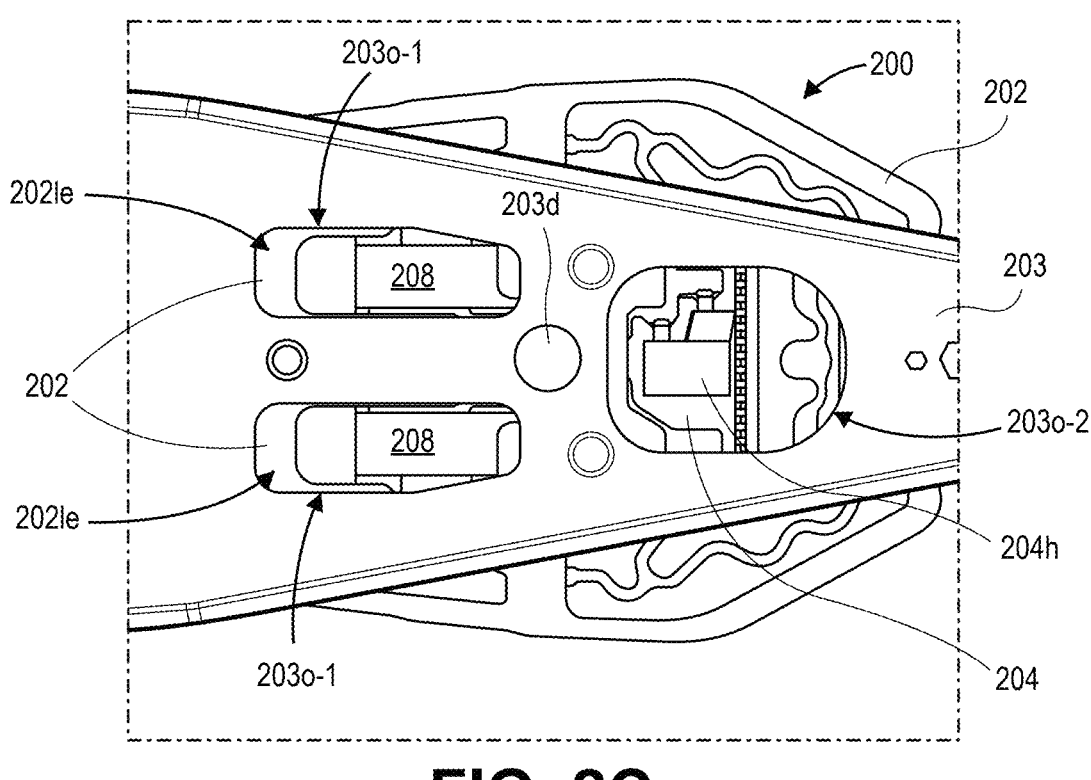
FIG. 2C is a load beam side plan view illustrating the HAMR HGA of FIG. 2B.
FIG. 3 is cross-sectional view corresponding to the HGA of FIGS. 2B-2C in a non-operational shock deflection condition.

Recall that it is the function of the flexure to provide gimbaled support for the slider so that the slider can pitch and roll in order to adjust its orientation. Further recall that customer specifications and/or common design and operational constraints include non-operational shock ("non-op shock") requirements, which generally relate to an HDD's resistance to or tolerance of a mechanical shock event. FIG. 2A is a slider side plan view illustrating a head gimbal assembly (HGA), FIG. 2B is a perspective view illustrating a heat-assisted magnetic recording (HAMR) HGA, and FIG. 2C is a load beam side plan view illustrating the HAMR HGA of FIG. 2B. Head gimbal assembly (HGA) 200 comprises a suspension assembly including a flexure 202 movably coupled with a load beam 203. A slider 204 is mounted on the flexure 202 (e.g., on a "flexure tongue" or "gimbal tongue" portion) and, while the flexure 202 is securely coupled with the load beam 203 via at least one weld, the HGA 200 is designed and configured such that the flexure 202 with slider 204 gimbals (e.g., pitches and rolls) about a dimple 203d. Here, the slider 204 is depicted as a HAMR slider, comprising a submount 204h with which a laser is coupled, and the load beam 203 further comprises a distal opening 203o-2 therethrough positioned to overlay the submount 204h.

When the HDD and by extension the HGA 200 are subjected to non-op shock, the fine actuator PZT elements 208 (or simply "PZT 208") are subjected to shock vibrational stress that could create hairline cracks or complete rupture of a PZT. This is especially potential with gimbal-based PZT actuator suspension designs because the gimbal portion of the flexure 202 is designed for read/write head (e.g., slider 204) flyability and thus the gimbal could pivot and bounce in response to contacts with the load beam 203 during non-op shock events. For example, with reference to FIG. 2C, leading edge (LE) portions 2021e of the flexure 202, shown through clearance openings 203o-1, may contact the load beam 203 during such an event.

FIG. 3 is cross-sectional view corresponding to the HGA of FIGS. 2B-2C in a non-operational shock deflection condition. Note here that the slider 204 is depicted facing up rather than down as in FIGS. 2B-2C. Note also that the flexure 202 is a considerably thin component and is configured to be structurally flexible. Also recall that the flexure 202 is configured to gimbal when in contact with the dimple 203d (FIGS. 2B-2C) of the load beam 203 (depicted in simplified form here as a thin membrane). The point being that the flexure 202 is significantly flexible/elastic and therefore its response to a shock event is complex, i.e., non-trivial. As depicted, portions of the flexure 202, including the flexure LE portion 2021e in particular along with the slider 204, flex downward at some time in response to the shock event. Here, flexure LE portion 2021e is shown as about to contact with the load beam 203 at the labeled area 205, as part of a downward flex response. Further, PZT 208 is depicted here as bending somewhat in response to the shock event and the consequent response of flexure 202. Such bending stress, in conjunction with the significant stress that is further induced to the PZT 208 responsive to actual flexure 202-load beam 203 contact, can damage the structural integrity of the fine actuator PZTs 208.

Hence, protecting and ensuring the mechanical integrity of the fine actuator PZTs (e.g., PZT 208) is a goal associated with maintaining their functional performance and reliability, as any failure to a PZT could be catastrophic to the HDD. One approach may involve increasing PZT thickness to make it more resistant to shock stress. However, this would result in a gimbal mass increase that could degrade its actuation and dynamic performance. Another approach may involve implementing a narrow-width load beam design, which is not necessarily practical in the context of a HAMR load beam due to the typical laser diode attachment opening (e.g., opening 203o-2 in load beam 203). Thus, there remain challenges with flexure gimbal clearance relative to the load beam, such as in response to non-op shock events, in order to protect the integrity of the fine actuator PZT elements.

Load Beam with Contact-Avoidance Openings

Figure 4:
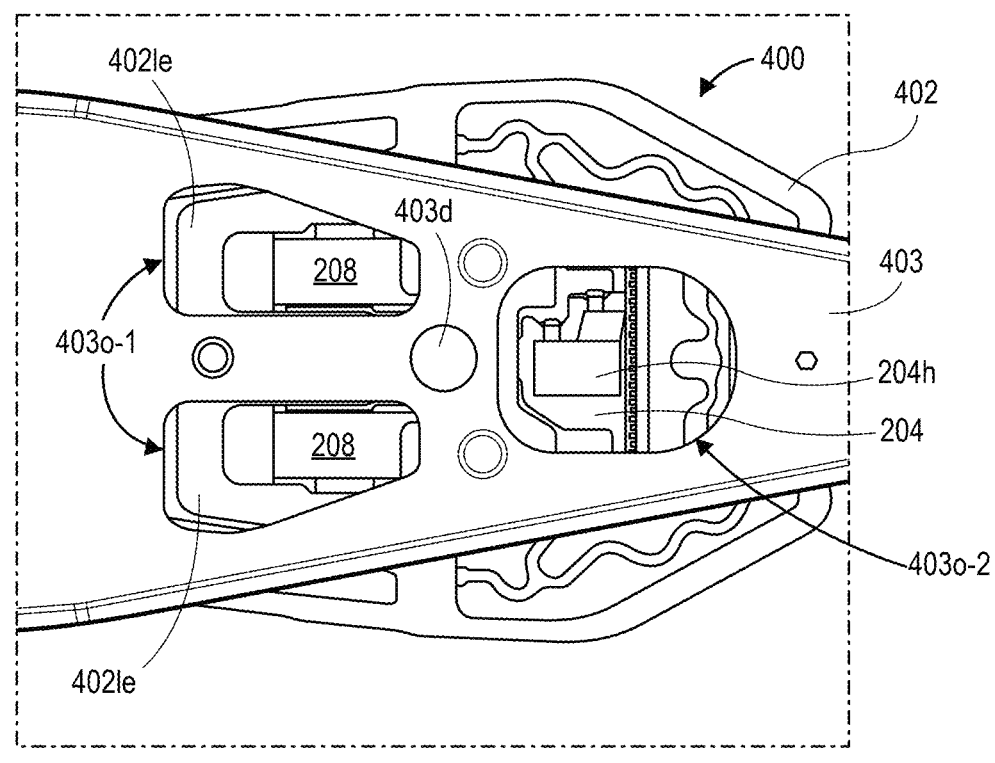
FIG. 4 is a load beam side plan view illustrating an HGA, according to an embodiment.

FIG. 4 is a load beam side plan view illustrating an HGA, according to an embodiment. In some ways similar to HGA 200 of FIGS. 2A-2C, head gimbal assembly (HGA) 400 comprises a suspension assembly including a flexure 402 movably coupled with a load beam 403. A slider 204 is mounted on the flexure 402 (e.g., on a "flexure tongue" or "gimbal tongue" portion) and, while the flexure 402 is securely coupled with the load beam 403 via at least one weld, the HGA 400 is designed and configured such that the flexure 402 with slider 204 gimbals (e.g., pitches and rolls) about a dimple 403*d*. According to an embodiment, slider 204 is configured as a HAMR slider comprising a submount 204*h* (FIG. 4) with which a laser is coupled, and the load beam 403 further comprises a distal opening 403*o*-2 therethrough positioned to overlay the submount 204*h*.

Figure 5:
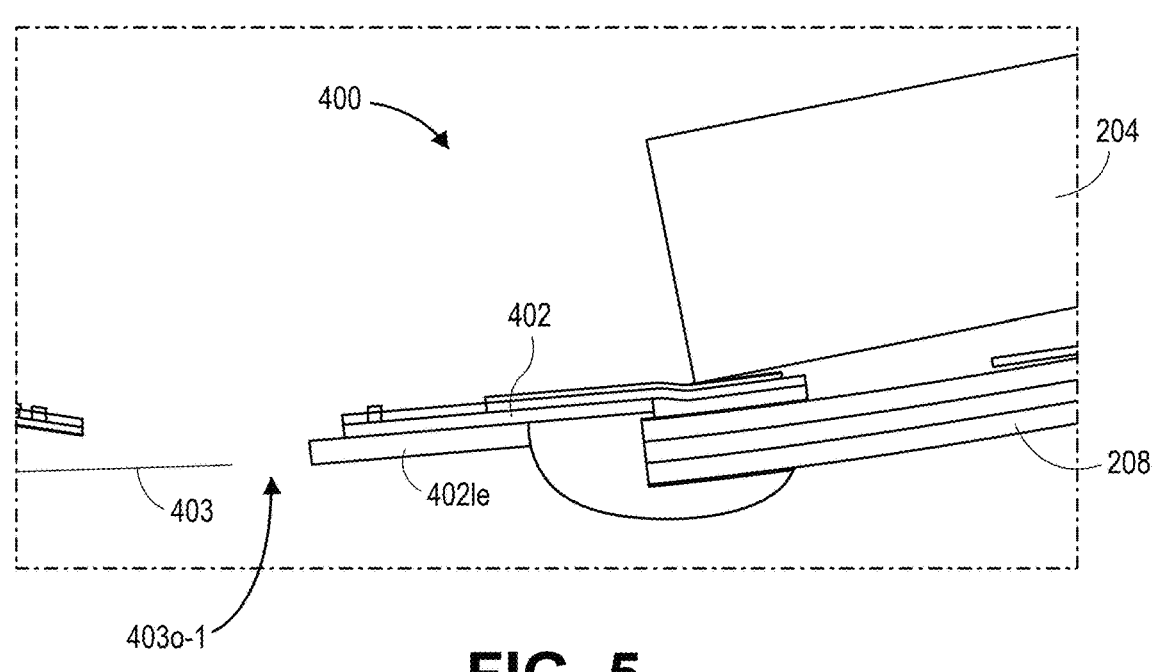
FIG. 5 is cross-sectional view corresponding to the HGA of FIG. 4 in a non-operational shock deflection condition, according to an embodiment.

Generally, here also when the HDD and by extension the HGA 400 are subjected to non-op shock, the fine actuator PZT elements 208 are subjected to shock vibrational stress that could damage a PZT. However, in view of the enhanced openings 403*o*-1 of load beam 403, leading edge (LE) portions 4021*e* of the flexure 402, shown through one or more opening 403*o*-1, are prohibited from contact with the load beam 403 during such an event. This is because each opening 403*o*-1 of the load beam 403 is shaped and positioned to overlay the respective corner portion of the LE portion 4021*e* (e.g., LE portion of the tongue portion) of the flexure 402 to avoid contact between the load beam 403 and the corner portion of the LE portion 4021*e* in response to a shock event. FIG. 5 is cross-sectional view corresponding to the HGA of FIG. 4 in a non-operational shock deflection condition, according to an embodiment. Note here that the slider 204 is depicted facing up rather than down as in FIG. 4. As depicted, portions of the flexure 402, including the flexure LE portion 4021*e* in particular along with the slider 204, may still flex downward at some time in response to the shock event. Here, flexure LE portion 4021*e* is depicted to show that it would not contact the load beam 403 (depicted in simplified form here as a thin membrane) at the area 205 of FIG. 3 as part of the downward flex response. Thus, some degree of stress (e.g., impact stress) that is induced to the PZT 208 responsive to flexure 402-load beam 403 contact is avoided and therefore damage to the fine actuator PZTs 208 is likewise avoided/prohibited. Studies have shown that PZT 208 survivability under non-op shock would improve significantly for a configuration as depicted and described for HGA 400, in comparison to the PZT 208 corresponding to a configuration as depicted and described for HGA 200 (FIGS. 2A-3).

Figure 6:
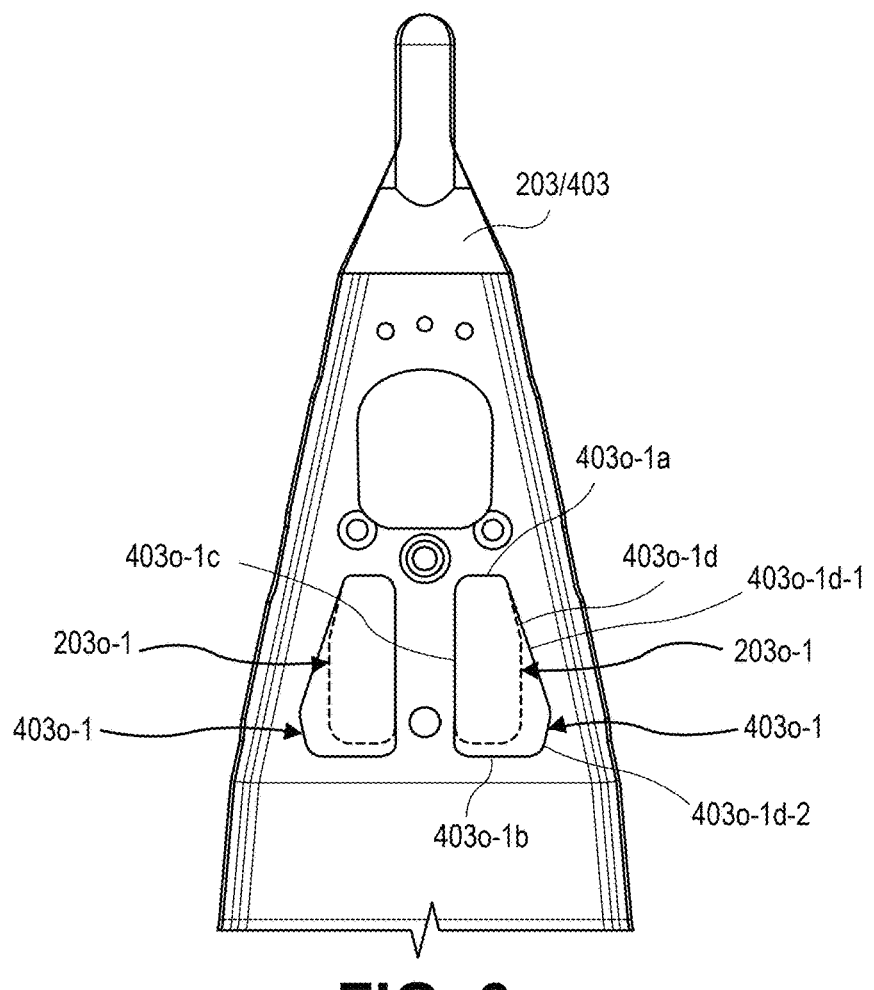
FIG. 6 is a plan view schematic illustrating the load beam openings corresponding to the HGA of FIG. 2C and the HGA of FIG. 4, according to an embodiment.

FIG. 6 is a plan view schematic illustrating the load beam openings corresponding to the HGA of FIG. 2C and the HGA of FIG. 4, according to an embodiment. The openings 403*o*-1 of HGA 400 are shown superimposed over the openings 203*o*-1 of HGA 200. This comparison illustrates that openings 403*o*-1 are generally longer and wider at a proximal end than the openings 203*o*-1, thus providing the desired clearance with flexure 402 (FIGS. 4-5). According to an embodiment, each opening 403*o*-1 of the load beam 403 comprises a distal edge 403*o*-1*a*, a proximal edge 403*o*-1*b* opposing the distal edge 403*o*-1*a* and having a length greater than the length of the distal edge 403*o*-1*a*, an inner edge 403*o*-1*c* connecting the distal and proximal edges 403*o*-1*a*, 403*o*-1*b*, and an outer edge 403*o*-1*d* opposing the inner edge 403*o*-1*c* and comprising a distal portion 403*o*-1*d*-1 extending at an angle greater than 90 degrees, for a majority of the distance between the distal edge 403*o*-1*a* and the proximal edge 403*o*-1*b*, from the distal edge 403*o*-1*a* to a proximal portion 403*o*-1*d*-2 extending from the distal portion 403*o*-1*d*-1 to the proximal edge 403*o*-1*b*. This or a similar shape for openings 403*o*-1 provides the desired physical/mechanical clearance between flexure 402 and load beam 403 in the context of a shock event.

Method of Assembling a Head Gimbal Assembly

FIG. 7 is a flow diagram illustrating a method of manufacturing a head gimbal assembly, according to an embodiment. A head gimbal assembly (HGA) assembled, manufactured, produced according to the method of FIG. 7 is designed, configured, intended for implementation into a hard disk drive (HDD) (see, e.g., FIG. 1).

At block 702, form a load beam comprising a plurality of proximal openings therethrough. For example, load beam 403 is formed with a plurality of proximal openings 403*o*-1 therethrough.

At block 704, couple a flexure to a slider side of the load beam, where the flexure comprises a gimbal portion to which a plurality of piezoelectric actuator elements are coupled, and the gimbal portion comprises leading edge corner portions proximal to the piezoelectric actuator elements, and where each of the openings of the load beam is shaped and positioned to overlay each respective corner portion of the flexure to avoid contact between the load beam and the corner portion in response to a shock event. For example, flexure 402 is coupled to a slider side of the load beam 403, where the flexure 402 comprises a gimbal (or tongue) portion to which a plurality of piezoelectric (PZT) actuator elements 208 are coupled and the gimbal portion comprises leading edge corner portions 4021*e* proximal to the PZTs 208, and where each of the openings 403*o*-1 of the load beam 403 is shaped and positioned to overlay each respective corner portion 4021*e* of the flexure 402 to avoid contact between the load beam 403 and the corner portion 4021*e* in response to a shock event.

Thus, in view of the embodiments described herein, flexure gimbal clearance relative to the load beam is provided/enabled to protect the integrity of the fine actuator PZT elements, for example, in response to non-op shock events. Hence, PZT reliability and life-cycle are enhanced, and the use of thinner/lighter PZTs is enabled which may boost the actuation and dynamic performance thereof.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110*b* that includes a magnetic read-write head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110*d* attached to the lead suspension 110*c*. The HDD 100 also includes at least one recording medium 120 rotatably mounted on a spindle 124 and a drive motor (not visible) attached to the spindle 124 for rotating the medium 120. The read-write head 110*a*, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a are transmitted by a flexible cable assembly (FCA) 156 (or "flex cable", or "flexible printed circuit" (FPC)). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin, providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without contacting a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management, and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O (input/output) intensive data, and the like. Further, a hybrid drive may be architected and configured essentially as two storage devices in a single enclosure, i.e., a traditional HDD and an SSD, with either one or multiple interfaces for host connection.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps and are not intended to specify or require a particular order of carrying out such steps.

What is claimed is:

1. A head gimbal assembly (HGA) comprising:
a load beam comprising a proximal opening therethrough; and
a flexure coupled with the load beam, the flexure comprising:
a tongue portion to which a fine actuator is coupled, the tongue portion comprising a corner portion proximal to the fine actuator;
wherein the opening of the load beam is shaped and positioned to overlay the corner portion of the tongue portion of the flexure to avoid contact between the load beam and the corner portion in response to a shock event.

2. The HGA of claim 1, wherein the opening of the load beam further overlays at least a portion of the fine actuator.

3. The HGA of claim 1, wherein the fine actuator comprises a pair of piezoelectric elements.

4. The HGA of claim 1, wherein the opening of the load beam comprises greater than four edges.

5. The HGA of claim 1, wherein the opening of the load beam comprises:
a distal edge;
a proximal edge opposing the distal edge and having a length greater than the length of the distal edge;
an inner edge connecting the distal and proximal edges; and
an outer edge opposing the inner edge and comprising a distal portion extending at an angle greater than 90 degrees, for a majority of the distance between the distal edge and the proximal edge, from the distal edge to a proximal portion extending from the distal portion to the proximal edge.

6. The HGA of claim 1, wherein:
the proximal opening through the load beam is a first lateral opening;
the load beam further comprises a second lateral opening opposing the first lateral opening about a load beam centerline;
the corner portion of the tongue portion of the flexure is a first lateral corner portion;
the tongue portion of the flexure further comprises a second lateral corner portion opposing the first lateral corner portion about a flexure centerline; and
the second lateral opening of the load beam is shaped and positioned to overlay the second lateral corner portion of the tongue portion of the flexure to avoid contact between the load beam and the second lateral corner portion in response to a shock event.

7. A hard disk drive comprising the HGA of claim 1.

8. A hard disk drive (HDD) comprising:
recording disk media rotatably mounted on a spindle;

means for reading from and writing to a recording disk medium of the recording disk media;
means for moving the means for reading and writing to access portions of the recording disk media; and
a head gimbal assembly (HGA) coupled with the means for moving, the HGA comprising:
a load beam comprising a proximal opening therethrough, and
a flexure coupled with the load beam, wherein:
the flexure comprises a tongue portion to which a fine actuator is coupled, and
the tongue portion comprises a corner portion proximal to the fine actuator,
wherein the opening of the load beam is shaped and positioned to overlay the corner portion of the tongue portion of the flexure to avoid contact between the load beam and the corner portion in response to a shock event.

9. The HDD of claim 8, wherein the opening of the load beam further overlays at least a portion of the fine actuator.

10. The HDD of claim 8, wherein the fine actuator comprises a pair of piezoelectric elements.

11. The HDD of claim 8, wherein the opening of the load beam comprises greater than four edges.

12. The HDD of claim 8, wherein the opening of the load beam comprises:
a distal edge;
a proximal edge opposing the distal edge and having a length greater than the length of the distal edge;
an inner edge connecting the distal and proximal edges; and
an outer edge opposing the inner edge and comprising a distal portion extending at an angle greater than 90 degrees, for a majority of the distance between the distal edge and the proximal edge, from the distal edge to a proximal portion extending from the distal portion to the proximal edge.

13. The HDD of claim 8, wherein:
the proximal opening through the load beam is a first lateral opening;
the load beam further comprises a second lateral opening opposing the first lateral opening about a load beam centerline;
the corner portion of the tongue portion of the flexure is a first lateral corner portion;
the tongue portion of the flexure further comprises a second lateral corner portion opposing the first lateral corner portion about a flexure centerline; and
the second lateral opening of the load beam is shaped and positioned to overlay the second lateral corner portion of the tongue portion of the flexure to avoid contact between the load beam and the second lateral corner portion in response to a shock event.

14. The HDD of claim 8, wherein:
the means for reading and writing comprises a heat-assisted magnetic recording (HAMR) head slider comprising a submount with which a laser is coupled; and
the load beam further comprises a distal opening therethrough, the distal opening positioned to overlay the submount.

15. A method of manufacturing a head gimbal assembly (HGA), the method comprising:
forming a load beam comprising at least one proximal opening therethrough; and
coupling a flexure to a slider side of the load beam; wherein;

the flexure comprises a gimbal portion to which at least one piezoelectric actuator element is coupled, the gimbal portion comprises at least one leading edge corner portion proximal to the at least one piezoelectric actuator element, and each opening of the load beam is shaped and positioned to overlay each respective corner portion of the gimbal portion of the flexure to avoid contact between the load beam and the corner portion in response to a shock event.

16. The method of claim 15, wherein coupling the flexure further comprises coupling the flexure such that the opening of the load beam further overlays at least a portion of the at least one piezoelectric actuator element.

17. The method of claim 15, wherein:

forming the load beam includes forming multiple proximal openings therethrough;

the flexure comprises the gimbal portion to which multiple piezoelectric actuator elements are coupled; and the gimbal portion comprises multiple leading edge corner portions, wherein each corner portion is proximal to one of the multiple piezoelectric actuator elements.

18. The method of claim 15, wherein forming the load beam comprises forming the at least one opening with each opening comprising:

a distal edge;

a proximal edge opposing the distal edge and having a length greater than the length of the distal edge;

an inner edge connecting the distal and proximal edges; and an outer edge opposing the inner edge and comprising a distal portion extending at an angle greater than 90 degrees, for a majority of the distance between the distal edge and the proximal edge, from the distal edge to a proximal portion extending from the distal portion to the proximal edge.

19. The method of claim 15, further comprising:

attaching to the flexure a heat-assisted magnetic recording (HAMR) head slider comprising a submount with which a laser is coupled; and wherein the load beam further comprises a distal opening therethrough, the distal opening positioned to overlay the submount.

* * * * *